H. F. FRENCH.
ELECTRIC BATTERY.
APPLICATION FILED JULY 20, 1915.

1,251,005.

Patented Dec. 25, 1917.

WITNESS
H. G. Grover

INVENTOR.
HARRY F. FRENCH
BY Ira J. Adam
ATTORNEY

UNITED STATES PATENT OFFICE.

HARRY F. FRENCH, OF FREMONT, OHIO, ASSIGNOR, BY MESNE ASSIGNMENTS, TO NATIONAL CARBON COMPANY, INC., A CORPORATION OF NEW YORK.

ELECTRIC BATTERY.

1,251,005.

Specification of Letters Patent.　　Patented Dec. 25, 1917.

Application filed July 20, 1915.　Serial No. 40,843.

*To all whom it may concern:*

Be it known that I, HARRY F. FRENCH, a citizen of the United States, residing at Fremont, in the county of Sandusky and State of Ohio, have invented a certain new and useful Improvement in Electric Batteries, of which the following is a full, clear, and exact description.

This invention relates to electric batteries and more particularly to an arrangement for preventing upward displacement or bulging of the seal in a cell. Although my invention is primarily adapted for use with the common six-inch dry cell, it may be used with any battery having a sealed end.

The ordinary dry cell, as is well known, consists of a zinc container, a central carbon electrode, a filling material and a pitch or analogous seal. The function of the seal is to minimize the danger of the escape of electrolyte and the evaporation of water from the cell. It has been found necessary in the manufacture of dry cells to employ, ordinarily, a seal construction which permits of the escape of gas from the cell to avoid the development of an excessive internal pressure due to the collection of gaseous products of chemical action.

To meet some conditions of use or storage, or the characteristics of some types of cell construction, it is difficult to put in a seal which successfully fulfils all its purposes.

The most common defect is "bulging," in which pressure within the cell causes displacement of the sealing material. Usually the seal adheres to the carbon electrode and gives way or bulges at certain points adjacent to the container, although the bulging may occur in various ways. When the seal is so displaced, leakage and excessive evaporation may occur and connections between cells be corroded off or broken. For these and other reasons the behavior is very deleterious. It is the purpose of my improvement to remedy this defect.

Figure 1:
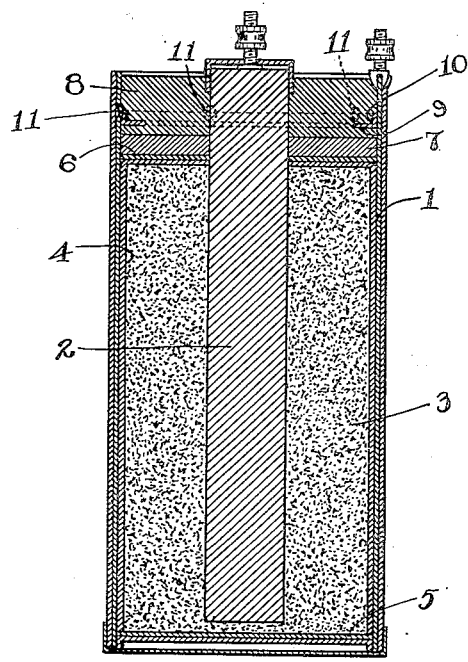

Figure 1 of the accompanying drawing shows a cross section of a dry battery having a retaining member for the seal, according to my invention.

Figure 2:
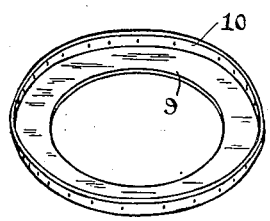

Fig. 2 shows the retaining member in perspective.

In the drawing the dry cell consists of a cylindrical zinc container 1, a carbon electrode 2 and a mix 3 surrounding the carbon electrode consisting of an electrolyte and depolarizer. The interior of the container 1 may have a pulp-board lining 4 and a paper disk 5 in the bottom, as is usual in dry cells. On top of the mix a paper ring 6 is fitted around the carbon electrode and above this is usually added one or more layers 7 of absorbent, such as sand, corrugated paper, etc., and a seal 8 of pitch is poured on top of the absorbent.

My invention consists in attaching a suitably shaped collar to the zinc container at such a position that it will extend into or be embedded in the seal 8 when this is poured into the container. In the form illustrated the collar, which may be made of zinc or other metal, has a circular turned-up edge 10 perpendicular to the flat annular portion 9 which extends from the zinc can directly into the seal. The outer diameter of this collar is substantially the same as that of the interior of the container, so that a close fit is obtained. When gas is generated in the cell the pressure on the seal adjacent the zinc will be resisted by the flange 9 and the seal will not bulge upward.

The collar may be fitted in the container before the seal is poured, or after it is partially poured, and attached to the zinc container in any manner, such as by soldering, riveting, etc., though I prefer for this purpose to form a number of punch marks 11 in the container, extending into or above the collar.

A suitable seal reinforced in this way will retain its position even when an excessive pressure is developed within. The retaining ring is easily applied to the container so that the improvement adds very little to the cost of the cell.

Having described my invention, what I claim is:—

1. In electrical batteries, a container, an electrode therein, a mix in the container, a seal for closing one end of the container and a collar engaging the inner surface of said end and extending transversely into said seal whereby upward bulging of the seal is opposed.

2. In electrical batteries, a container, a mix therein, a seal for one end of the container, a collar L-shaped in cross section embedded in said seal, one flange of said collar engaging the end of the container and the other projecting inwardly into the seal, and means for holding the collar in the container, comprising a plurality of indentations in the container.

In testimony whereof, I hereunto affix my signature.

HARRY F. FRENCH.